United States Patent

Brown

[15] 3,657,919

[45] Apr. 25, 1972

[54] APPARATUS FOR CALIBRATING A VOLUMETRIC FLOW METERING DEVICE

[72] Inventor: Robert A. Brown, London, England

[73] Assignee: Eastman Kodak Company, Rochester, N.Y.

[22] Filed: Aug. 3, 1970

[21] Appl. No.: 60,451

[30] Foreign Application Priority Data

Apr. 17, 1970 Great Britain.....................18,512/70

[52] U.S. Cl............................................................73/3
[51] Int. Cl.......................................................G01f 25/00
[58] Field of Search....................73/3, 194 R, 395, 401, 232, 73/262, 269

[56] References Cited

UNITED STATES PATENTS 3,177,699  4/1965  Lindquist et al..............................73/3
3,208,284  9/1965  Rivero.....................................73/395

FOREIGN PATENTS OR APPLICATIONS 805,945  2/1969  Canada....................................73/395

Primary Examiner—Louis R. Prince
Assistant Examiner—William A. Henry, II
Attorney—Walter O. Hodsdon and Alfred P. Lorenzo

[57] ABSTRACT

Apparatus for use in the calibration of volumetric flow metering devices, such as metering pumps, comprises a hollow receptacle divided into two separate chambers by a moveable wall member, one of the chambers being adapted to receive fluid from the flow metering device and the other being filled with a calibrating liquid and connected to a vessel for receiving the calibrating liquid and measuring the volumetric rate at which it is received. In calibrating a metering device, the outlet from the device is connected to the inlet of the fluid-receiving chamber and fluid flowing through the metering device discharges into this chamber and, after filling it, causes the moveable wall member to displace the calibrating liquid in the adjacent chamber at a rate commensurate with the flow rate through the metering device.

3 Claims, 1 Drawing Figure

PATENTED APR 25 1972
3,657,919
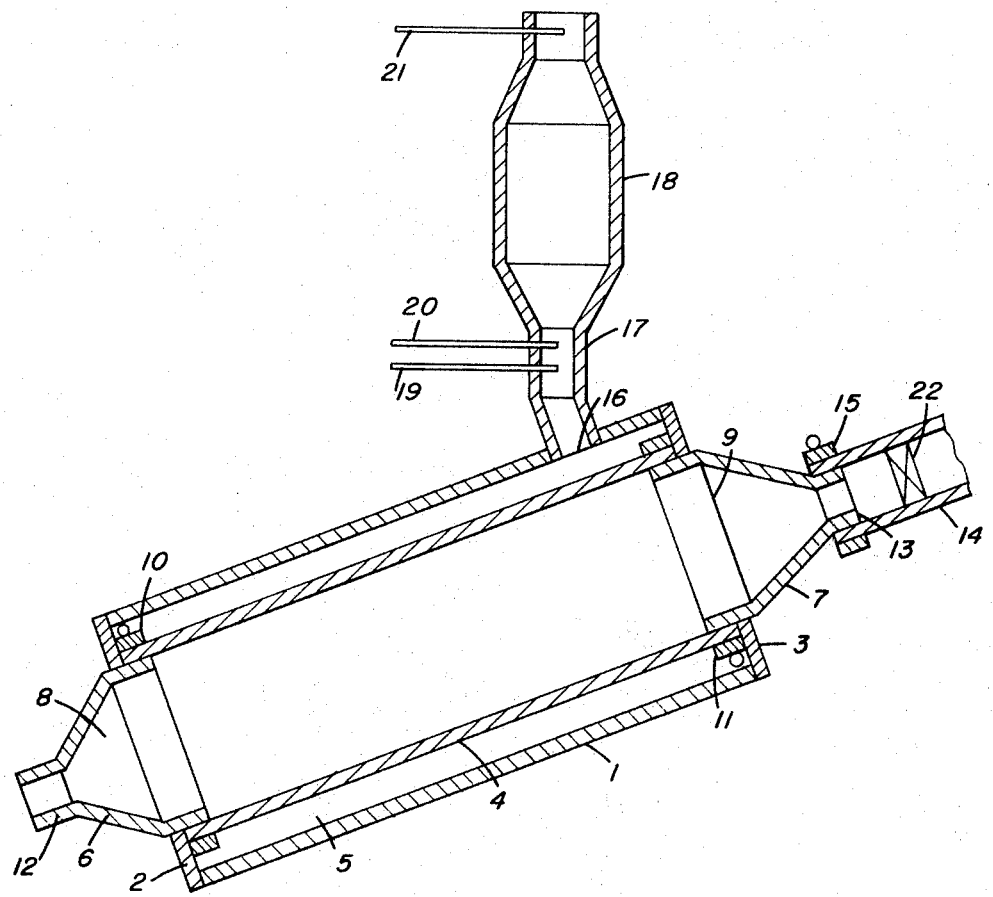
ROBERT A. BROWN
INVENTOR.
BY Alfred P. Lorenzo
Walter O. Hodsdon
ATTORNEYS

APPARATUS FOR CALIBRATING A VOLUMETRIC FLOW METERING DEVICE

This invention relates in general to the calibration of flow metering devices and in particular to a novel apparatus for use in calibrating volumetric flow metering devices which permits the device to be calibrated with the fluid it meters in service.

Volumetric flow metering devices, such as metering pumps, require periodic calibration to ensure that they provide accurate readings. While there are a number of known methods for effecting such calibration, none of them are fully satisfactory when the fluid that is metered is highly viscous, or corrosive, or has a tendency to froth. Thus, if the output from a metering device handling such a fluid is diverted into a calibration vessel, one or more serious problems which significantly hinder the calibration procedure will commonly be encountered. For example, if the fluid is viscous it will stick to the walls of the calibration vessel and this will necessitate extensive cleaning of the vessel between calibrations, while if it is corrosive the calibration vessel will be attacked and accurate measurement will be impaired. If froth formation occurs to a significant extent, it will be extremely difficult to obtain an accurate measure of the rate at which the fluid fills the calibration vessel. On the other hand, if a special liquid having the desired physical properties is used for calibration by directing it through the metering device and collecting it in the calibration vessel, the performance of the metering device is determined for this particular liquid only and must be estimated for the fluid it actually meters in service, and this is inherently inaccurate.

In accordance with this invention, there is provided an apparatus for use in the calibration of volumetric flow metering devices which avoids the aforesaid problems and is especially adapted to use with metering devices handling viscous, corrosive or froth-forming fluids. The calibration apparatus comprises a hollow receptacle of fixed capacity divided into two separate chambers of complementary variable capacity by a moveable wall member, one of the chambers being adapted to receive fluid from the flow metering device and the other being adapted to hold a calibrating liquid. The two chambers can be constructed in various ways, for example, the apparatus can comprise a rigid tube enclosing a flexible tube and forming therebetween an annular space or chamber for holding the calibrating liquid or it can comprise a rigid housing divided into two chambers by a flat flexible membrane, with one of the chambers serving as a reservoir for the calibrating liquid. A calibrating vessel is connected to the chamber which holds the calibrating liquid to receive the calibrating liquid therefrom, and is equipped with conventional means for measuring the volumetric rate at which calibrating liquid is received, for example, a pair of conductivity probes mounted within the vessel and spaced to provide an exact known volume therebetween and an electrical timing system to measure the exact time required for this volume to be filled. The metering device is calibrated with the fluid it handles in service by utilizing this fluid to displace the calibrating liquid into the calibrating vessel. To accomplish this, the outlet from the metering device is connected to the inlet to the calibrating apparatus and the outlet from the calibrating apparatus is closed off. Fluid flowing through the metering device into the fluid-receiving chamber of the calibrating apparatus causes the moveable wall member, e.g. the flexible tube or flexible membrane, to displace the calibrating liquid into the calibrating vessel, the displacement rate being the same as the flow rate through the metering device. In this way, the metering device is, in effect, calibrated with the fluid actually handled in service, while the calibrating liquid used may be a liquid which has the desired physical properties for this use, e.g. a liquid which is of low viscosity, non-corrosive and non-frothing.

The invention is further described herein with reference to the accompanying drawing, consisting of a single FIGURE depicting in vertical section an apparatus constructed in accordance with the present invention.

As shown in the drawing, the apparatus comprises a rigid cylindrical outer case or housing 1 provided with end plates 2 and 3. A flexible tube 4 is mounted within the outer case 1, to form therewith an annulus 5, by means of two end members 6 and 7 which are secured in a fluid-tight manner in apertures 8 and 9 in the end plates 2 and 3, respectively. The ends of flexible tube 4 are fixed to the end members 6 and 7 respectively by means of clips 10 and 11. The end member 6 terminates in a tubular portion 12 which may be attached to a supply line (not shown) from the outlet of a volumetric flow metering device (not shown) which is to be calibrated. The other end member 7 terminates in a tubular portion 13 to which a tube 14 is attached by means of a clip 15. At the upper end of outer case 1 is provided an aperture 16 in which is fixed one end of a tube 17, the other end of which is attached to a vessel 18. At the bottom of vessel 18 and extending into the vessel is a grounded electrode 19. Above the grounded electrode 19 and also extending into the vessel are a bottom electrode 20 and a top electrode 21. In use, the annulus 5 is filled with a calibrating liquid, such as water containing a salt to make it adequately conductive, to a level which is below the bottom electrode 20.

To utilize the calibrating apparatus, it is connected to the outlet of the metering device which is to be calibrated and the fluid which is metered flows from the metering device through tubular portion 12 and flexible tube 4 and out through tubular portion 13. When it is required to perform a calibration, the tube 14 is closed, such as by means of shut-off valve 22. Fluid continues to flow into flexible tube 4 which is thus caused to expand, thereby reducing the volume of annulus 5, so that some calibrating liquid is displaced from annulus 5 into vessel 18. As the expansion of flexible tube 4 continues, the level of the calibrating liquid in vessel 18 continues rising, first covering the grounded electrode 19, then bottom electrode 20 which activates a timing device (not shown) of any known type, and then top electrode 21, which deactivates the timing device. Therefore, the length of time taken by the liquid to rise a predetermined distance in the vessel 18 is known. The volume of that portion of the vessel 18 extending between the electrodes 20 and 21 is predetermined and, therefore, the volumetric flow rate of the calibrating liquid out of the annulus 5 is known. This is the same as the volumetric flow rate of the fluid into the flexible tube 4.

An electrical control system for the apparatus would comprise two switches, one for initiating the measuring cycle and one for resetting a digital display of the timer to zero and also preventing a second test from being carried out until the walls of the vessel 18 have drained.

Conveniently, the closing of the tube 14 is effected by means of a valve which is automatically opened by means of a control unit when the top electrode 21 is contacted by the liquid rising in the vessel 18.

As will be apparent from the aforegoing description, the apparatus of this invention effects calibration of the metering device with the fluid which is actually used in service and, thus, provides greater accuracy than calibration procedures utilized heretofore in which a special calibrating liquid is directed through the metering device. In utilizing the invention, a calibrating liquid is chosen which has appropriate physical properties for such use, for example, if the calibrating vessel is equipped with spaced electrodes as shown herein, the calibrating liquid used will be of appropriate electrical conductivity. To carry out a calibration, flow through the metering device and calibrating apparatus should be continued for a sufficient time to allow stable control to become established before the timed period begins. The system can be operated remotely, i.e. with the timer and associated controls being at one location and the calibrating apparatus at another, as would be particularly advantageous when the metering device is remote from its control system.

The invention has been described in detail with particular reference to preferred embodiments thereof, but it will be understood that variations and modifications can be effected within the spirit and scope of the invention.

I claim:

1. An apparatus for calibrating a volumetric flow metering device, comprising
   a flexible tube,
   a rigid housing surrounding said tube and forming therewith an enclosed annular space for holding a calibrating liquid,
   inlet means communicating with said tube for connection to an outlet from said flow metering device,
   outlet means from said tube for opening and closing said tube to flow of fluid therethrough, and
   a vessel for receiving said calibrating liquid communicating with said annular space, said vessel being equipped with means for measuring the volumetric rate at which said calibrating liquid is received therein, whereby fluid flowing through said metering device into said tube when said outlet means is closed causes expansion of said tube with resulting displacement of said calibrating liquid into said vessel at a rate commensurate with the volumetric flow rate of said fluid.

2. An apparatus for calibrating a volumetric flow metering device, comprising
   a flexible tube,
   a rigid housing surrounding said tube and forming therewith an enclosed annular space for holding a calibrating liquid,
   inlet means communicating with one end of said tube for connection to an outlet from said flow metering device,
   a valve at the end of said tube opposite to the end in communication with said inlet means for opening and closing said tube to flow of fluid therethrough, and
   a vessel for receiving said calibrating liquid communicating with said annular space, said vessel being equipped with means for measuring the volumetric rate at which said calibrating liquid is received therein, whereby fluid flowing through said metering device into said tube when said valve is closed causes expansion of said tube with resulting displacement of said calibrating liquid into said vessel at a rate commensurate with the volumetric flow rate of said fluid.

3. An apparatus for calibrating a volumetric flow metering device, comprising
   a hollow rigid walled receptacle of fixed capacity,
   a moveable flexible internal wall member dividing the interior of said receptacle into first and second separate chambers of complementary variable capacity, said first of said chambers being adapted to hold a calibrating liquid,
   inlet means communicating with the second of said chambers for connection to an outlet from said flow metering device,
   outlet means from said second chamber for opening and closing said second chamber to flow of fluid therethrough, and
   a vessel for receiving said calibrating liquid communicating with said first chamber, said vessel being equipped with means for measuring the volumetric rate at which said calibrating liquid is received therein, whereby fluid flowing through said metering device into said second chamber when said outlet means is closed causes expansion of said wall member with resulting displacement of said calibrating liquid into said vessel at a rate commensurate with the volumetric flow rate of said fluid.

* * * * *